US007760189B2

(12) United States Patent
Cheston et al.

(10) Patent No.: US 7,760,189 B2
(45) Date of Patent: Jul. 20, 2010

(54) TOUCHPAD DIAGONAL SCROLLING

(75) Inventors: Richard W. Cheston, Morrisville, NC (US); Daryl C. Cromer, Apex, NC (US); Howard J. Locker, Cary, NC (US); Caroline Arrowood Patzer, Chapel Hill, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 838 days.

(21) Appl. No.: 11/041,054

(22) Filed: Jan. 21, 2005

(65) Prior Publication Data

US 2006/0164399 A1 Jul. 27, 2006

(51) Int. Cl.
G09G 5/00 (2006.01)
(52) U.S. Cl. .................. 345/173; 178/18.03; 715/702
(58) Field of Classification Search .......... 715/702, 715/863; 345/173, 156, 175; 178/18.03
See application file for complete search history.

(56) References Cited

U.S. PATENT DOCUMENTS

| 5,664,132 | A |   | 9/1997  | Smith                   |
|-----------|---|---|---------|-------------------------|
| 5,748,185 | A | * | 5/1998  | Stephan et al. .... 345/173 |
| 5,864,330 | A |   | 1/1999  | Haynes                  |
| 5,880,717 | A |   | 3/1999  | Chan et al.             |
| 5,943,043 | A | * | 8/1999  | Furuhata et al. ... 345/173 |
| 6,043,809 | A |   | 3/2000  | Holehan                 |
| 6,707,449 | B2 |  | 3/2004  | Hinckley et al.         |
| 6,958,749 | B1 | * | 10/2005 | Matsushita et al. .... 345/175 |
| 7,411,575 | B2 | * | 8/2008  | Hill et al. ........ 345/173 |
| 2006/0001650 | A1 | * | 1/2006 | Robbins et al. ...... 345/173 |
| 2006/0026521 | A1 | * | 2/2006 | Hotelling et al. ...... 715/863 |

OTHER PUBLICATIONS

IBM Technical Disclosure Bulletin, *Window Scrolling Anywhere in the Window*, vol. 36, No. 10, Oct. 1993.
IBM Technical Disclosure Bulletin, *Window Scrolling without Scroll Bars*, vol. 36, No. 10, Oct. 1993.
Research Disclosure, *Simultaneous Two-Dimensional Direct Manipulation Window Scrolling*, Jul. 1992, No. 339.

* cited by examiner

*Primary Examiner*—Kevin M Nguyen
(74) *Attorney, Agent, or Firm*—Sawyer Law Group LLP; Carlos Munoz-Bustamante

(57) ABSTRACT

A method and system for providing diagonal scrolling on a touchpad of a device is disclosed. The method and system comprises determining if at least one finger is in contact with the touchpad, and entering a diagonal scroll mode if more than one finger is in contact with the touchpad. A system and method in accordance with the present invention allows the user to initiate a diagonal scroll at any location on a touchpad by using two fingers, thereby greatly enhancing the functions of the touchpad and allowing the user to manipulate computer programs from the touchpad much more efficiently and easily. The present invention supports diagonal scrolling on a touchpad and does not require a precise location for vertical or horizontal scrolling, since the entire touchpad area/surface can be used.

16 Claims, 2 Drawing Sheets

TOUCHPAD DIAGONAL SCROLLING

FIELD OF THE INVENTION

The present invention relates generally to touchpads and more specifically to scrolling using a touchpad.

BACKGROUND OF THE INVENTION

Touchpads utilizing conventional software allow the user to scroll either vertically or horizontal by running a finger along the edge of the touchpad. However, it is not possible for users to carry out a diagonal scroll utilizing conventional touchpad software. Also, frequently the user has to look carefully in order to position their finger correctly onto the touchpad.

Many users who work with computer programs such as spreadsheets would find it far more convenient and efficient to be able to scroll diagonally across columns while using a touchpad input device, than to be restricted to horizontal and vertical scrolling as at present. Such diagonal scrolling would enable them to complete their spreadsheet duties much more quickly and accurately. Also, not having to look down at the touchpad to determine where to place a finger would save the person inputting or checking data much additional time, and eliminate the distraction of taking the user's eye from the spreadsheet.

Accordingly, what is needed is a system and method for carrying out diagonal scrolling on a conventional touchpad input device, thereby making the user's experience with the touchpad more efficient, easy, and making the touchpad more directly utilized by the user. The present invention addresses such a need.

SUMMARY OF THE INVENTION

A method and system for providing diagonal scrolling on a touchpad of a device is disclosed. The method and system comprise determining if at least one finger is in contact with the touchpad, and entering a diagonal scroll mode if more than one finger is in contact with the touchpad.

A system and method in accordance with the present invention allows the user to initiate a diagonal scroll at any location on a touchpad by using two fingers, thereby greatly enhancing the functions of the touchpad and allowing the user to manipulate computer programs from the touchpad much more efficiently and easily. The present invention supports diagonal scrolling on a touchpad and does not require a precise location for vertical or horizontal scrolling, since the entire touchpad area/surface can be used. The system and method in accordance with the present invention will also operate correctly on existing touchpads when a change in software drivers has been carried out.

DETAILED DESCRIPTION

The present invention relates generally to touchpads and more specifically to scrolling using a touchpad. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
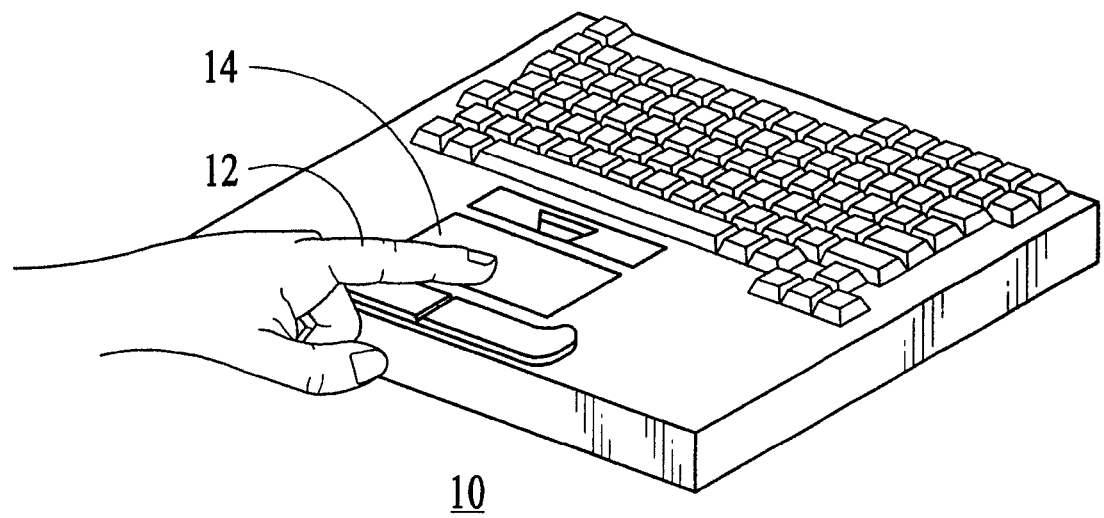
FIG. 1 illustrates the conventional one-finger utilization of a touchpad input device for a computer.

A conventional touchpad is capable of determining how much of the touchpad surface area is being touched. FIG. 1 illustrates the conventional one-finger utilization of a touchpad surface 14 which is integrated with a keypad 16 for a computer 10. This feature is utilized in touchpads at present to determine if the user's palm is touching the touchpad surface 14 (in which case there is no response from the touchpad) vs. finger 12 stimulation of the touchpad surface 14.

Figure 2:
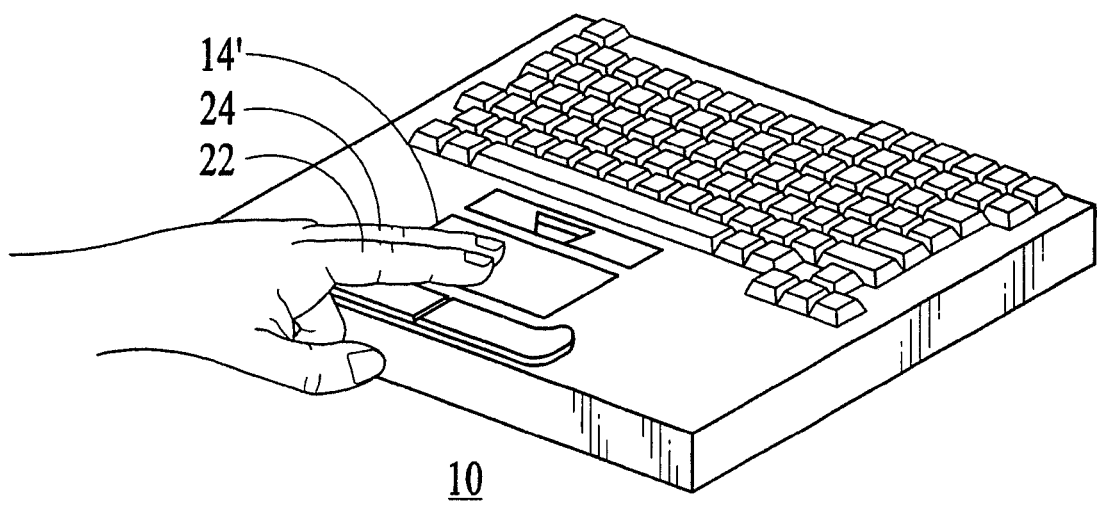
FIG. 2 illustrates the placement of two fingers on the touchpad, which causes the touchpad to enter into diagonal scroll mode.
Figure 3:
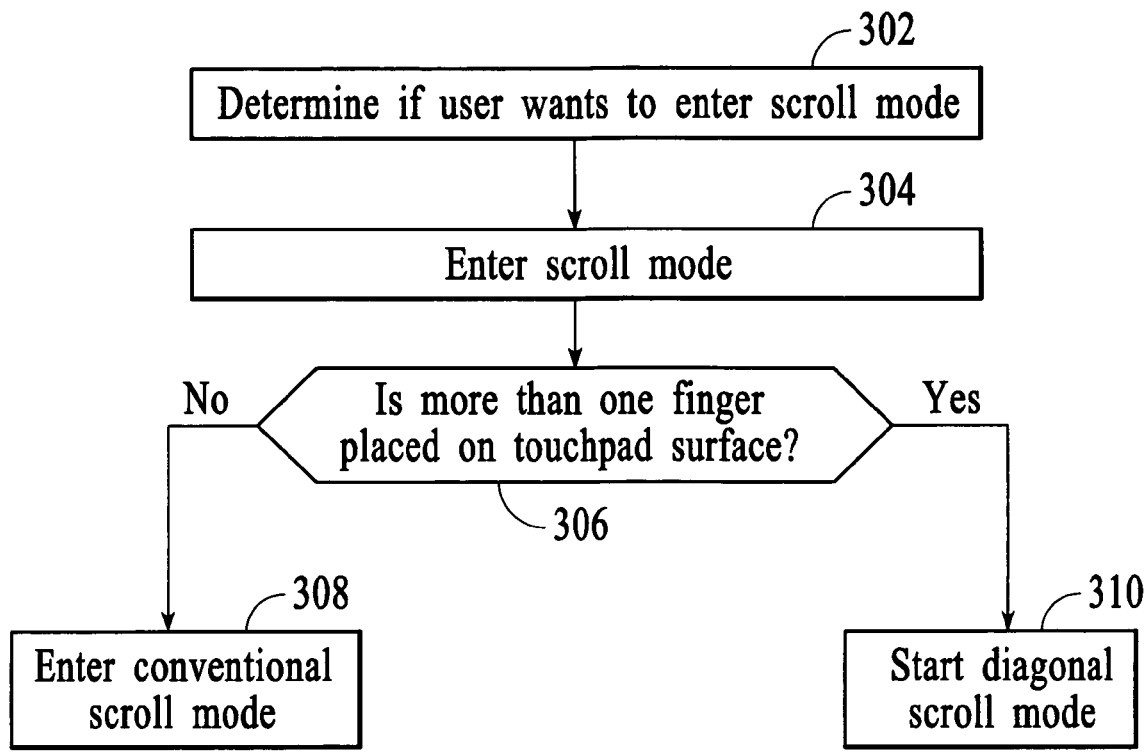
FIG. 3 is a flowchart which describes the process by which the software functions in accordance with the present invention.

FIG. 2 illustrates the placement of two fingers 22 and 24 on the touchpad surface 14', which causes the computer 10 to enter into diagonal scroll mode. When the user places two fingers 22 and 24 onto the touchpad surface 14, the user is able to scroll diagonally in the direction of the two-finger movement, thereby allowing for much more flexibility in interacting with the image on the display (not shown). As mentioned earlier, if the user utilizes only one finger, the touchpad surface will function in the same way as touchpads currently operate with conventional one-finger software. All other touchpad features (speed, etc.) also function properly with the method and system in accordance with the present invention. It also should be understood that although two finger movement is described for diagonal scrolling any number of fingers greater than one can be utilized and that would be within the spirit and scope of the present invention. It should be also understood that the present invention can be implemented in device using program instructions from a computer readable medium such as a floppy disk, CD, DVD Flash memory or could be downloadable via a public network such as the Internet.com To describe the method and system in accordance with the present invention in greater detail, refer now to the following paragraphs. FIG. 3 is a flowchart which describes the process in accordance with the present invention. First, it is determined if the user wants to enter scroll mode, via step 302. Next, the scroll mode is entered, via step 304. Then it is determined if more than one finger is placed on the surface of the touchpad, via step 306. If only one finger is placed onto the touchpad surface, then the conventional scroll mode is initiated, via step 308. If more than one finger is placed onto the surface of the touchpad, then diagonal scroll mode is initiated, via step 310.

Figure 4:
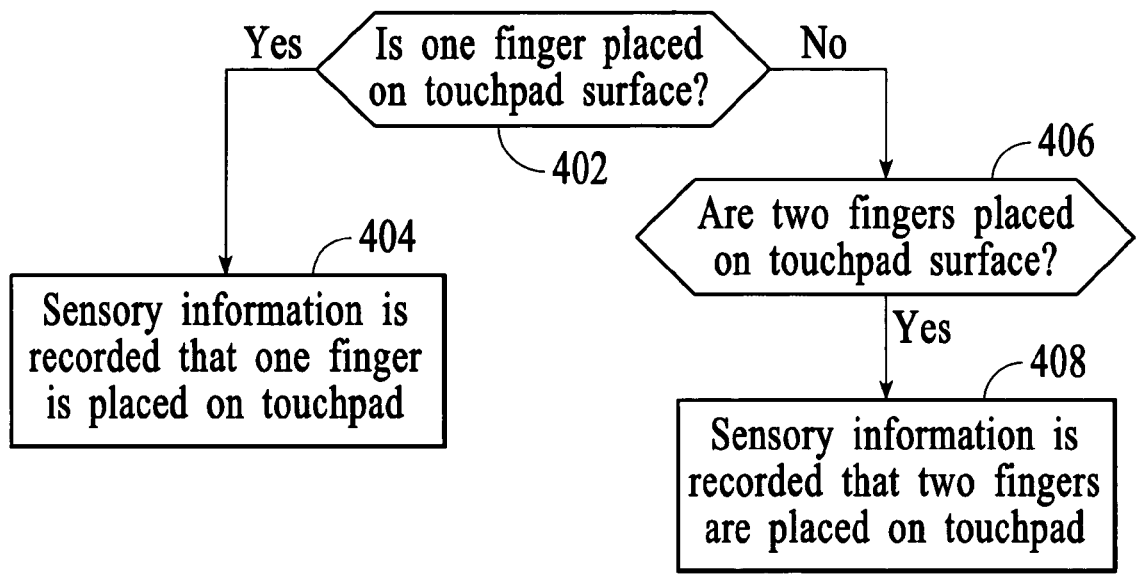
FIG. 4 is a flowchart illustrating a training process in accordance with the present invention.

Because the size of fingers varies greatly from person to person, it may be necessary to train a device to recognize whether one or two fingers are placed onto the surface of the touchpad. FIG. 4 is a flowchart illustrating a training process in accordance with the present invention. First, the user places one on the touchpad surface. To determine whether one finger is placed on the surface of the touchpad the user is queried as to whether the user is placing one finger is placed on the surface of the touchpad, via step 402. If the user responds affirmatively, then sensory information is recorded so that one-finger placement can be recognized from this point forward, via step 404. If the user responds negatively, then the user is queried as to whether two fingers on the touchpad, via step 406. If the user responds affirmatively, then sensory information is recorded and the placement of two fingers onto the touchpad surface can be recognized from this point forward, via step 408.

The system and method in accordance with the present invention allows the user to initiate a diagonal scroll at any location on a touchpad, thereby greatly enhancing the functions of the touchpad and allowing the user to manipulate computer programs from the touchpad much more efficiently and easily.

Although the present invention has been described in accordance with the embodiments shown, one of ordinary skill in the art will readily recognize that there could be variations to the embodiments and those variations would be within the spirit and scope of the present invention. For example, although the method and system in accordance with the present invention depicts a touchpad device as an integrated part of a portable computer, the present invention would also function equally as well if the touchpad device were external to a computer. In addition the method and system in accordance with the present invention could be utilized in a variety devices, such as portable computer laptop computers, desktop computers, PDAs and the like. Accordingly, many modifications may be made by one of ordinary skill in the art without departing from the spirit and scope of the appended claims.

What is claimed is:

1. A method for providing diagonal scrolling on a touchpad of a device, the method comprising:
    determining if at least one finger is in contact with the touchpad;
    entering a diagonal scroll mode if more than one finger is in contact with the touchpad, and
    scrolling diagonally in the diagonal scroll mode within the touchpad of the device in the direction of the more than one simultaneous finger contact.

2. The method of claim 1 wherein the determining step comprises:
    entering a scroll mode on the device;
    determining if there is at least one finger on the touchpad surface; and
    entering a conventional scroll mode if one finger is on the touchpad surface.

3. The method of claim 1 wherein the device comprises a computer.

4. The method of claim 1 wherein the device comprises a personal digital assistant.

5. The method of claim 1 wherein the touch pad is integrated with the device.

6. The method of claim 1 wherein the touchpad is external to the device.

7. The method of claim 1 wherein the determining step includes recognizing how many fingers are placed on the touchpad surface.

8. The method of claim 7 wherein the recognizing step includes:
    a first querying of a user as to whether one finger is placed on the touchpad surface;
    recording one finger placement if the user responds affirmatively to the first querying;
    a second querying of the user as to whether more than one finger is on the touchpad surface if the user responds negatively to the first querying;
    recording a multiple finger placement if the user responds affirmatively to the second querying; and
    repeating the above steps until finger placement is recognized.

9. A computer readable medium containing program instructions for providing diagonal scrolling on a touchpad of a device, the program instructions for:
    determining if at least one finger is in contact with the touchpad;
    entering a diagonal scroll mode if more than one finger is in contact with the touchpad, and
    scrolling diagonally in the diagonal scroll mode within the touchpad of the device in the direction of the more than one simultaneous finger contact.

10. The computer readable medium of claim 9 wherein the determining step comprises:
    entering a scroll mode on the device;
    determining if there is at least one finger on the touchpad surface; and
    entering a conventional scroll mode if one finger is on the touchpad surface.

11. The computer readable medium of claim 9 wherein the device comprises a computer.

12. The computer readable medium of claim 9 wherein the device comprises a personal digital assistant.

13. The computer readable medium of claim 9 wherein the touch pad is integrated with the device.

14. The computer readable medium of claim 9 wherein the touchpad is external to the device.

15. The computer readable medium of claim 9 wherein the determining step includes recognizing how many fingers are placed on the touchpad surface.

16. The computer readable medium of claim 15 wherein the recognizing step includes:
    a first querying of a user as to whether one finger is placed on the touchpad surface;
    recording one finger placement if the user responds affirmatively to the first querying;
    a second querying of the user as to whether more than one finger is on the touchpad surface if the user responds negatively to the first querying;
    recording a multiple finger placement if the user responds affirmatively to the second querying; and
    repeating the above steps until finger placement is recognized.

* * * * *